H. D. WILLIAMS.
VARIABLE SPEED GEAR.
APPLICATION FILED APR. 14, 1909.

1,263,180.

Patented Apr. 16, 1918.
5 SHEETS—SHEET 4.

WITNESSES

INVENTOR
HARVEY D. WILLIAMS
BY
ATTORNEYS

UNITED STATES PATENT OFFICE.

HARVEY D. WILLIAMS, OF WASHINGTON, DISTRICT OF COLUMBIA, ASSIGNOR TO WATERBURY TOOL COMPANY, OF WATERBURY, CONNECTICUT, A CORPORATION OF CONNECTICUT.

VARIABLE-SPEED GEAR.

1,263,180.  Specification of Letters Patent.  Patented Apr. 16, 1918.

Application filed April 14, 1909. Serial No. 489,869.

*To all whom it may concern:*

Be it known that I, HARVEY D. WILLIAMS, a citizen of the United States, and resident of Washington, District of Columbia, have invented certain new and useful Improvements in Variable-Speed Gears, of which the following is a specification.

My invention relates to variable speed gears and is especially applicable to the differential gear of automobiles. The object of my invention is to provide a device of this character distinguished by great compactness, relative lightness and unusual flexibility as regards changes of speed.

The practical carrying out of my invention is exemplified in the accompanying drawings, in which Fig. 7 is a cross section on line 7—7 of Fig. 4; Fig. 8 is a vertical section showing part of the machine and taken on line 8—8 of Fig. 4; Fig. 9 is a detail of the universal joint connection between the motor and the wheel axle; Figs. 10 and 11 are a face view and a side view respectively of a hook-shaped piece fitted to the end of the connecting rod; Fig. 12 is a section of a yoke taken on line 12—12 of Fig. 13, which shows a face view of said yoke; Fig. 14 is a section on line 14—14 of Figs. 12 and 13; Fig. 15 is a section of the socket 66 taken in a plane at a right angle to that of Fig. 12; Fig. 16 is a section on line 16—16 of Fig. 3.

Figures 1, 2:
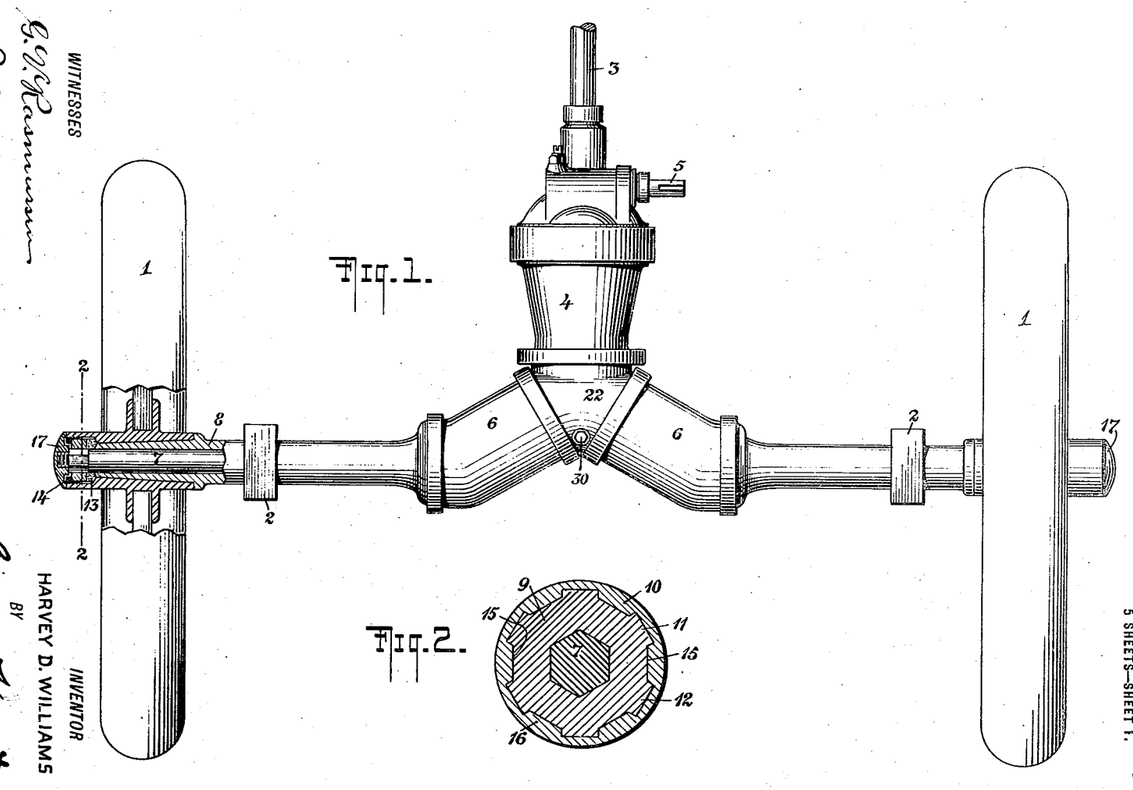
Figure 1 is a plan view showing the rear wheels and axle of an automobile with my differential gear applied thereto.
Fig. 2 is a vertical section on line 2—2 of Fig. 1 drawn upon an enlarged scale.

Fig. 1 shows the assembled gear as applied to the rear axle of an automobile.

Figure 3:
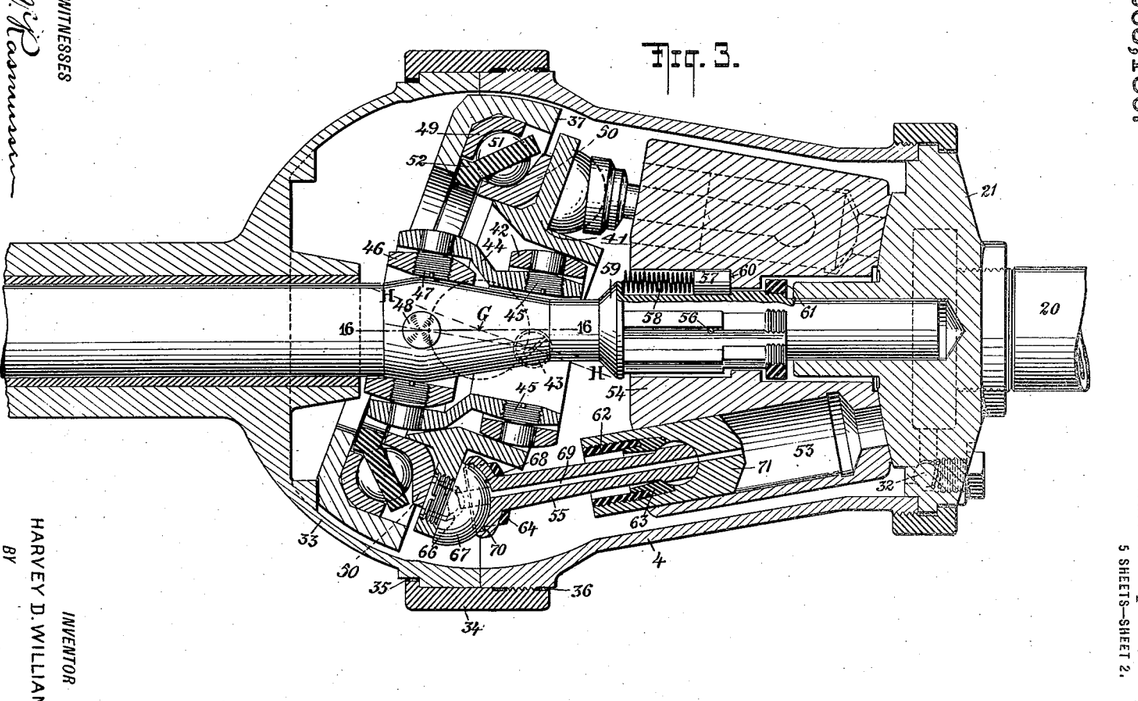
Fig. 3 is a horizontal longitudinal section through the pump which is driven by the engine of the car.
Figures 4, 17:
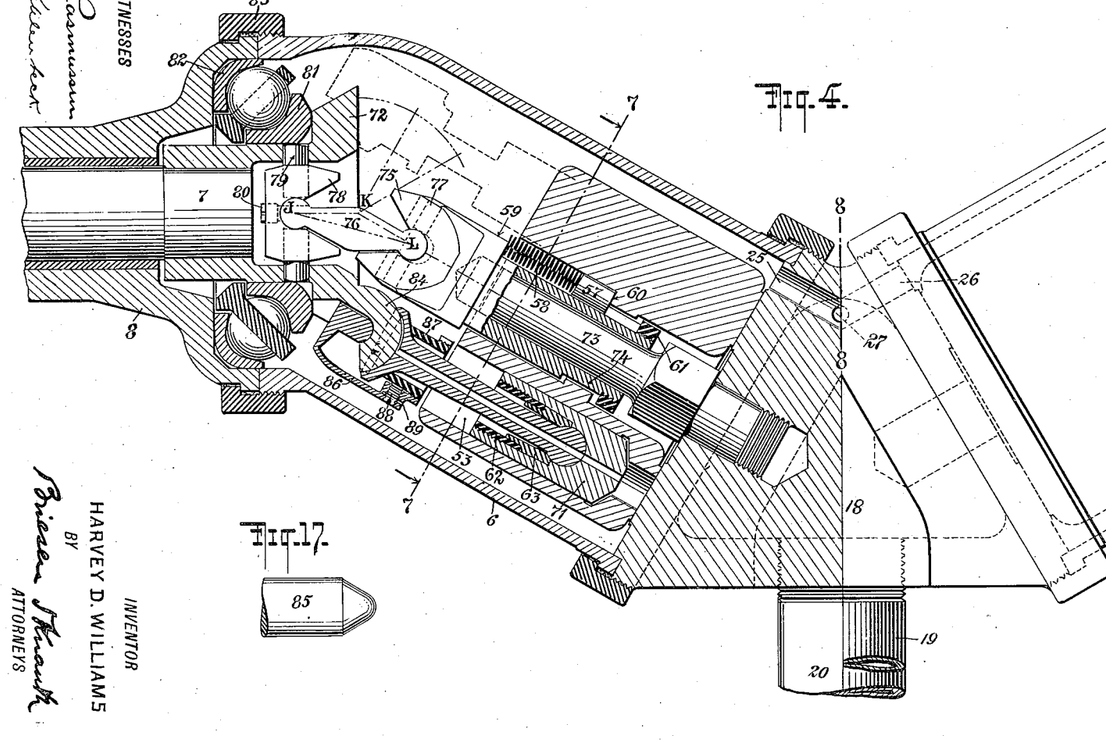
Fig. 4 is a plan view, partly in section, of the two motors driven by said pump and actuating the wheel-carrying axles.
Fig. 17 shows a cutter for recessing a ring forming part of the gear.
Figure 5:
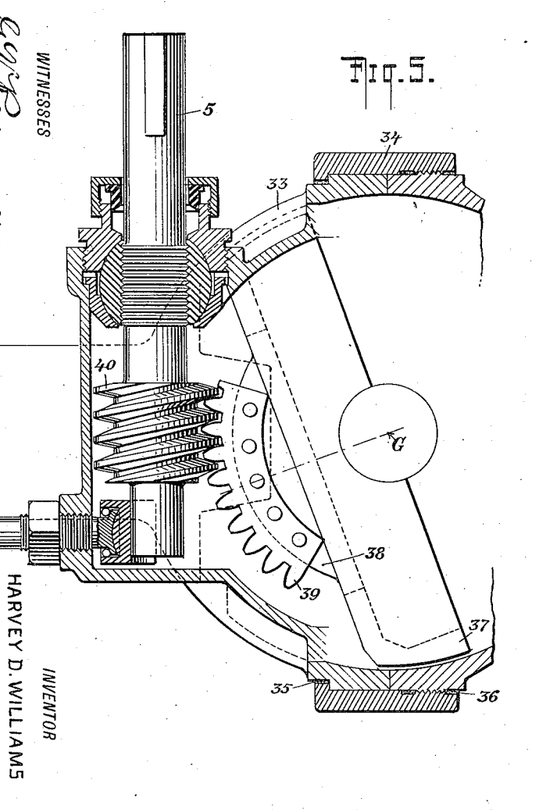
Fig. 5 is a horizontal section showing one form of the speed-varying mechanism.
Figures 7, 8, 9, 10, 11, 12, 13, 14, 15, 16:
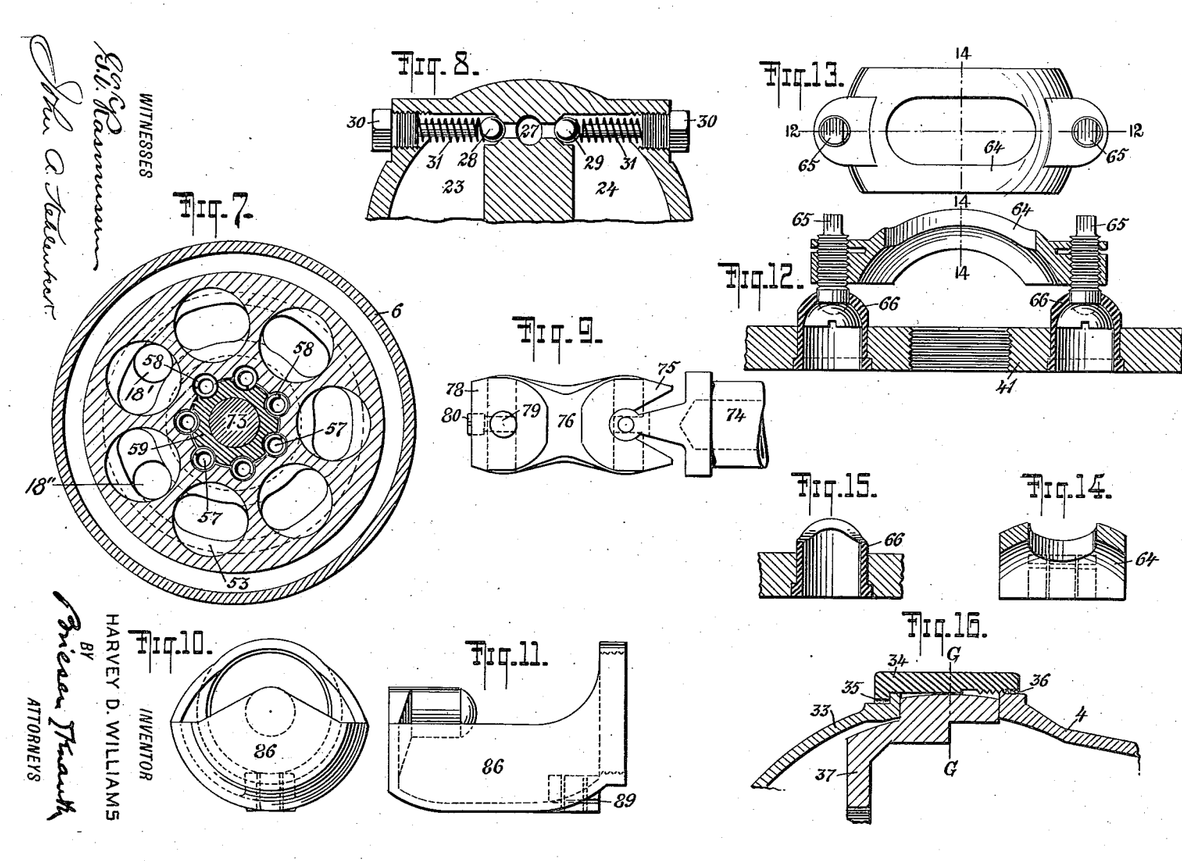

1, 1 are the road wheels and 2—2 are the pads to which the springs are attached in the usual manner; 3 is an extension of the engine crank shaft; 4 is a seven-cylinder pump, the per-revolution capacity of which (as also the direction of circulation through which) is controlled by the shaft 5; 6—6 are two seven-cylinder motors, which receive oil at high pressure from the pump 4 and return the same to the pump at low pressure. The motor shaft 7 is connected to the road wheel 1 in such manner that the shaft 7 is subjected to pure torque and the load of the road wheel 1 is taken, not on the shaft 7, but on the part 8 which by virtue of its large diameter is much better able to resist a transverse bending strain. The shaft 7 has a hexagonal portion which engages with the sleeve 9, which in turn engages with the inside of the wheel hub 10 by means of a series of projecting keys 11, 12, etc. Thus the sleeve 9 while constraining the shaft 7 and the hub 10 to rotate together, is yet free to slide axially with reference to both. The sleeve 9 is accordingly made to serve as a gland for compressing the packing 13 the purpose of the packing being to prevent leakage of oil from the inside of the motor 6 by way of the joint between the casing 8 and the shaft 7. As a gland, 9 is tightened by means of the ring 14 which has screw-thread engagement with the projections 15, 16, etc., on the inside of the wheel hub 10. The nut 17 screwed tight onto the threaded end of the shaft 7 bears against the end of the hub 10 and together with a ball bearing at the other end of the shaft 7 secures the several parts against relative longitudinal displacement. The triangular port block 18 Fig. 4 is shown in connection with two circulating pipes 19 and 20. The lower one of these pipes 20 appears also in Fig. 3 in connection with the port block 21. The circulating pipes 19 and 20 are made use of when it is desired to place the pump, at a considerable distance from the motors. The pipes are, however, unnecessary and in Fig. 1 they are omitted and the port blocks 18 and 21 are combined into the one port block 22. Fig. 8 shows the two cavities 23 and 24 which, in the port block 22 are combined with similar cavities in the port block 21, the lower one of which is shown in dotted outline in Fig. 3.

The neutral oil spaces of the two motors are in communication with each other through the two intersecting holes 25, 26 Fig. 4. These holes at their intersection 27 Fig. 8, communicate through the replenishing check valves 28 and 29 with the cavities 23 and 24 respectively. The plugs 30 serve to close the holes through which the ball valves are inserted and also to limit the lift of the valves, while the springs 31 exert a slight pressure holding the valves to their seats. 32 Fig. 3 is a similar replenishing check valve between the lower cavity of the valve block and the neutral oil space of the pump. A like valve is placed in a similar passage between the upper cavity of the valve block and the neutral oil space of the pump.

The pump casing comprises the two parts 4 and 33 Fig. 3 and the threaded coupling ring 34 for fastening these two parts together. A tight joint is obtained by the insertion of calking material in the spaces 35 and 36 provided for that purpose.

Fig. 16 shows the manner in which the tilting box 37 is pivoted to the casing so as to turn with reference to the latter about the axis G G. As shown in Fig. 16, the orifice for the reception of the trunnion of 37 is one-half in the casing 4 and the other half is in the casing 33.

An integral part of the tilting box 37 is the fish-belly rib 38 to which is firmly secured, by riveting, the sector of the rim of a hobbed worm gear 39. Meshing with the worm gears 39 is the worm 40 made in one piece with the control shaft 5.

Connecting the driving shaft 3 with the ring 41 is the double universal joint comprising the following parts: the ring 42 with the screw pivots 43 introduced from the inside and pivoting 42 to 41; the intermediate sleeve 44 with the screw pivots 45 introduced from the inside and pivoting 44 to 42; the ring 46 with the screw pivots 47 introduced from the inside and pivoting 46 to 44; and finally the pin 48 which is the last part of the universal joint to be assembled and which is introduced through a clearance hole in the sleeve 44, drives tight into the shaft 3 and acts as a pivot between the shaft 3 and the ring 46.

Between the ring 41 and the tilting box 37 is a four point ball bearing made up, of the hardened steel ball races 49 and 50, the steel balls 51 and the brass cage or spacer 52.

The proportions and the symmetry of the double universal joint and the two parts connected by it are such that the axis H H of the ring 41 always intersects the trunnion axis G G of the tilting box 37, and the centers of the pins 43 and 48 are always as nearly as possible equidistant from the center G. That this last condition is not exactly fulfilled is evident from the consideration that since the distance from G to 43 is fixed by the relation of 37 to 41 as determined by the ball bearing, and the distance 48 to 43 is fixed by the sleeve 44, therefore the distance G to 48 cannot be constant for all proportions of the triangle 48, G, 43. In spite of this slight error, however, the double joint is very much superior to the single joint heretofore used in variable speed gears. The slight variability of the distance G to 48 means, since the point G is fixed, that the shaft 3 has a slight endwise movement in its bearings.

The cylindrical chambers 53 of the cylinder barrel 54 are inclined for the purpose of affording room for the universal joint, at the same time retaining the minimum possible diameter of the balance area between the cylinder barrel 54 and the port block 21. The surface of the port block toward which the cylinders converge, and which is engaged by the rotary barrel, is in this case of conical curvature instead of being plane: this also has the advantage of more perfectly guiding or centering the rotary barrel.

Fig. 3 shows the disposition of the parts at maximum tilting angle. It will be noted that the connecting rod 55 in its extreme or dead center position is in line with the axis of the cylindrical chamber 53. The same condition occurs again at the other dead center position of the connecting rod as shown in dotted lines on the diametrically opposite side of the cylinder barrel. In consequence of the condition just noted, the resultant of all transverse components of the thrusts of the several connecting rods acting at once is a force applied to a point which moves but a small fraction of an inch from the point marked 56 in the axis of the driving shaft (so that the resultant tendency toward tilting the cylinder barrel which should be avoided is but slight.)

The manner of keying the cylinder barrel 54 to the driving shaft 3 will be understood by referring to Fig. 7 which shows the same construction applied to the motors. The shaft does not touch the cylinder barrels directly, but between them there are interposed several cylindrical steel plugs 57 Figs. 3 and 4. The plugs fit freely in cylindrical orifices which are cut partly in the shaft and partly in the cylinder barrel as shown in Fig. 7.

Besides acting as keys between the shaft and the cylinder barrel and as lateral supports of the cylinder barrel in the plane of ports of the point 56, the plugs serve to transmit the pressure of the springs 58 from the shoulder 59 on the shaft 3 to the shoulder 60 in the cylinder barrel. It is evident that the opposite reactions of the springs 58 come ultimately, one on the balance area between 54 and 21, and the other on the trunnions of the tilting box 37, whence the reactions are balanced by being transmitted through the pump casing.

The collar 61, screw threaded to the shaft 3, is merely to facilitate handling the parts while assembling the machine.

The sleeve 62 is large enough to pass over the small end of the connecting rod.

The brass sleeve 63 is made in halves for the same purpose.

The sphere on the small end of the connecting rod has two parallel opposite flat spots to permit of its passage through the slot in the yoke 64, shown in detail in Figs. 12, 13, 14.

The yoke 64, pivoted to ring 41, (see Fig. 12) by the hemispherical headed screws 65 and the sockets 66, serves to take the pull of the connecting rod which is of only moderate amount. The thrust of the connecting rod which is much greater is taken on the hemispherical knobs 67 screwed into the ring 41.

The cup shaped larger end of the connecting-rod has a radial oil groove 68 leading from the central oil hole 69 to the annular oil groove 70. The maximum diameter of the annular oil groove 70 is only somewhat less than that of the plunger 71. Within that diameter however the pressure of oil will be the same at all points and equal to the pressure in 53. Hence the force of compression between 55 and 67 will be sustained almost wholly by the pressure of the oil between the bearing surfaces.

Referring to Fig. 4 it will be seen that the pump differs from the motor in having its shafts 7 placed at a fixed angle to the axis of the cylinder barrel. The principal advantage of this arrangement is that the universal joint does not have to transmit the entire power of the motor but only enough to overcome the friction of turning the cylinder barrel. As a consequence the universal joint can be made comparatively small and the simple parallel arrangement of the cylinder barrels can be retained as well as the flat balance area between the cylinder barrel and the port block. (When the cylinders are inclined as in Fig. 3 the balance area should be spherical, the sphere being of such radius that the cylinder axes prolonged will intersect at the center of the sphere). Another advantage of placing the shaft at an angle to the axis of the cylinder barrel is that it permits of a much smaller diameter of ball thrust bearing. Those surfaces of the port blocks or valve plates 18, 21 or 22 which are engaged by the rotary cylinder barrels 54 are each provided with curved or segmental ports such as 18', 18" in Fig. 7, one of these ports being in permanent connection with one cavity or chamber of the port block, say the cavity 23, and the other segmental port being in permanent communication with the other cavity (say 24). These segmental ports are adapted to register successively with the open adjacent ends of the cylinders 53, one port of each pair forming an inlet to the respective cylinders, and the other port an outlet therefrom.

In Fig. 4 the ring 72 is shrunk onto the shaft 7. The stud 73 is screwed tight into the port block 18. The sleeve 74 turns freely on the stud 73. The plugs 57, the springs 58, the shoulders 59 and 60 and the collar 61 have the same functions as the similarly numbered parts of Fig. 3.

A double universal joint connects the ring 72 with the sleeve 74. This joint comprises the following parts: Pivot blocks 75; intermediate connection 76; Locking pin 77; pivot block 78, two pivot pins 79, screw locking pin 80. The ends of the intermediate connection or link 76 are rounded and pivoted to the blocks 75 and 78 respectively, which are provided with corresponding sockets of cylindrical curvature the axes of which are parallel to each other and perpendicular to the plane in which the pivot pins 79 and the locking pin 77 are arranged.

Comparing Figs. 4 and 9 it will be seen that 76 prevents the displacement of 74 in relation to 75, 77 prevents the displacement of 76 in relation to 75, 80 prevents the displacement of 76 in relation to 78, 76 prevents the displacement of 78 in relation to 79, and the pins 79 which are the last parts to be assembled are introduced from the outside of the ring 72 and are held in place by the ball race 81.

The ball race 82 centers the two parts of the casing 6 and 8, and these are secured by the coupling ring 83. Since the positions of the axes of the shaft 7 and the sleeve 74 are fixed it is an easy matter to satisfy the requirement of the double universal joint to wit, that J K L Fig. 4 shall be an isosceles triangle on the base J L.

The large angular inclinations of the connecting rods and the close spacing of the hemispherical knobs 84 necessitates a special and peculiar construction for transmitting the pull of the connecting rods to the ring 72.

The knob 84 is an integral part of the ring 72. On the under side of the knob there is a cavity of the form that would be produced by the milling cutter 85, Fig. 17. The spherical part of this cavity is concentric with the spherical surface of the knob 84.

The pull of the connecting rod is sustained by the hook shaped piece 86 which is shown in greater detail in Figs. 10 and 11. The piece 86, as also the sleeve 87 for locating it with reference to the connecting rod and taking up the wear, are so shaped that they can be passed over the small end of the connecting rod and brought into proper positional relation with the ring 72. The set screw 88 holds 87 from turning in relation to 86 and the saw slit 89 permits of increasing the friction of the screw thread by bending the metal, thus locking the set screw.

Figure 6:
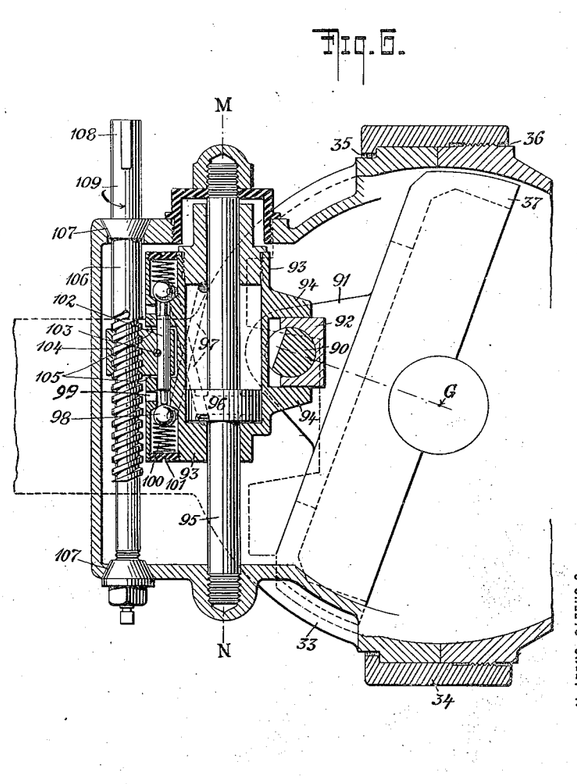
Fig. 6 is a similar view showing the preferred form of said mechanism.

Fig. 6 shows a section of the pump on a plane at right angles to the axis of the trunnions and parallel to the driving shaft axis, and at a distance from the latter sufficient to avoid interference between the parts shown and the driving shaft.

The pin 90 is rigidly attached to the tilting box by means of two ears 91 projecting from the latter.

The block 92 engages the pin 90 by a cylindrical surface and the cylinder casing 93 by two flat parallel surfaces on the lugs 94.

The cylinder casing 93 is constrained to move with reference to the main pump casing along the straight line M N by the piston rod 95 which is made in one piece with the piston 96. A rocking motion of the tilting box about its trunnions is therefore accompanied by a reciprocating motion of the cylinder 93 with reference to the stationary piston 96, and since the cylinder is filled with oil, the rocking motion of the tilting box is resisted by the piston 96 except as oil is allowed to flow out of one end of the cylinder and oil is sucked into the other end by way of the ports 97, the check valves 98 and the openings 99. Each check valve 98 is arranged so as to close against an increase of pressure within that end of the cylinder with which it is connected by the passage 97. The light springs 100 reacting against the fluid tight plugs 101, serve to hold the check valves 98 against their seats when there is no fluid pressure tending to do likewise. Each check valve is also arranged so that the direction of its closing movement is opposed to the direction of that movement of the cylinder 93 which the respective check valve resists by preventing the escape of fluid from the cylinder. Stated differently; the direction of the lifting movement of each check valve off its seat is the same as the direction of the cylinder movement which the said lifting movement permits.

The length of the pin 102 is a few thousandths of an inch less than the distance between the check valves 98 when the latter are closed.

The pin 102 has a sliding fit in the cylinder casing 93 and is secured by the taper pin 103 to the nut 104.

The clearance spaces 105 permit a slight longitudinal movement of the pin 102 in relation to the cylinder casing 93. The nut 104 is capable of being traversed by the screw 106 through a distance equal to the stroke of the cylinder and corresponding to the maximum swing of the tilting box.

The screw 106 passes through the pump casing by oil tight ground joints 107 and is arranged to be turned by hand-wheel or sprocket-wheel keyed on the end 108.

The operation of the device is as follows:

Suppose the tilting box to be in the position shown and it is desired to bring it to the mid-position. The screw 106 will be turned in the direction indicated by the arrow 109. This will cause the nut 104 to move toward the bottom of Fig. 6 carrying also the pin 102 which pushes open the lower check valve and allows oil to escape from above the piston 96. The escape of oil allows the cylinder casing 93 to move downward until the valve seat having overtaken the valve which was pushed open, that valve is closed and there follows a static equilibrium which persists until disturbed by a further turning of the screw 106.

In case the speed gear is running light there will be little or no tendency of the tilting box to change its angle by the action of parts of the speed gear other than the parts shown in Fig. 6. Under these conditions the tilting will be effected by the contact with the cylinder casing 93 of the nut 104 after the latter has moved through the small distance necessary to take up the clearance 105.

In case the speed gear is running under load the tilting box has a tendency to vibrate with a rocking motion about the trunnion axis. This is caused by the shifting of the center of pressure of the active plungers from one side to the other of the trunnion axis. The shifting taking place every time a plunger passes a dead center position, the tendency of the tilting box to vibrate and the resistance to the same offered by the piston 96 causes a rapid alteration of pressure from one end to the other of the cylinder 93. Under these conditions tilting is brought about by simply permitting these momentary pressures to be effective as checks to vibration in one end of the cylinder and not in the other, the cumulative effect being an appreciable displacement in the direction in which the vibrations are not checked.

Referring to Fig. 6 it will be seen that a downward movement of the nut 104 by opening the check valve 98 makes impossible any considerable pressure above the piston 96. The cylinder is therefore able to move downward when so impelled by the vibrating tendency of the tilting box. And this movement will continue as the cumulative effect of said vibratory tendency until it equals the movement of the nut 104. The valve seat has then overtaken the valve that was pushed open by the pin 102 and the valve functioning again as a check valve there is static equilibrium until there is a further movement of the nut 104.

It will be understood that under normal conditions, that is to say, with the valves 98 closed, there is no outlet for the oil contained in the cylinder 93, and thus the action of the oil trapped and temporarily under pressure between the stationary piston 96 and the ends of the cylinder 93, will oppose and prevent any rocking movement of the tilting box 37 which is connected with the cylinder 93. The two bodies of oil thus trapped will therefore hold the tilting box stationary notwithstanding the fact that the shifting pressures tend to make the tilting box vibrate or oscillate about its trunnions. As soon, however, as I open an outlet from one of the ends or compartments of the cylinder 93 (by opening one of the valves 98), the body of oil contained in such compartment is no longer trapped and pressure in said compartment will therefore be relieved so as no longer to oppose the movement of the tilting box in one direction. It will also be observed that I employ unitary means (the pin 102 and the nut 104, connected by the pin 103) for first relieving pressure (by unseating one of the valves 98) and then swinging the tilting box (by the positive engagement of the nut 104 with the cylinder casing 93).

I claim as my invention:

1. The combination of a drive shaft, two spaced alining driven shafts disposed at a right angle to the drive shaft, a rotary pump alining axially with the drive shaft and actuated thereby, two rotary motors arranged to receive and to be driven by the fluid propelled by said pump, said motors being disposed between the driven shafts and at an angle thereto, and operative connections from each motor to the respective driven shaft.

2. The combination of a drive shaft, two spaced alining driven shafts disposed at a right angle to the drive shaft, a rotary pump alining axially with the drive shaft and actuated thereby, two rotary motors arranged to receive and to be driven by the fluid propelled by said pump, said motors being disposed between the driven shafts and obliquely thereto at equal angles, and operative connections from each motor to the respective driven shaft.

3. The combination of the casing made of two sections, a coupling ring for connecting them, a tilting box provided with trunnions fitted between the adjacent edges of said sections, means for adjusting the inclination of said box, a ring mounted to rotate in a plane parallel to that of the tilting box, a shaft having a universal joint connection with said ring, a cylinder barrel held to rotate with said shaft and arranged in engagement with a ported surface of the casing, pistons arranged to reciprocate in the cylinders of said barrel, and an operative connection between said pistons and said rotary ring.

4. The combination of the ported valve block, the rotary barrel provided with cylinders arranged to communicate with the ports of said block, the shaft mounted to turn with said barrel, a sleeve having an internal universal connection with said shaft, a ring having an internal universal connection with said sleeve, pistons arranged to reciprocate in said cylinders, an operative connection between said pistons and ring, a tilting box provided with a race for said ring, and arranged to swing about an axis approximately equidistant from said universal connections of the shaft and ring respectively, and means for varying the inclination of said box.

5. The combination of the ported valve block, the rotary barrel provided with cylinders arranged to communicate with the ports of said block, the shaft mounted to turn with said barrel, pistons arranged to reciprocate in said cylinders, a ring operatively connected with said pistons, a tilting box provided with a race for said ring, means for varying the inclination of said box, and a sleeve having universal connections with the shaft and with the said ring respectively.

6. The combination of the ported valve block, the rotary barrel, provided with cylinders arranged to communicate with the ports of said block, the shaft mounted to turn with said barrel, pistons arranged to reciprocate in said cylinders, a ring operatively connected with said pistons, a sleeve having an external universal connection with the ring and an internal universal connection with the shaft, a tilting box provided with a race for said ring, and means for varying the inclination of said box.

7. The combination of the ported valve block, the rotary barrel provided with cylinders arranged to communicate with the ports of said block, the shaft mounted to turn with said barrel, pistons arranged to reciprocate in said cylinders, a ring operatively connected with said pistons, a sleeve having an external universal connection with the ring and an internal universal connection with the shaft, and a race for said ring, inclined relatively to the shaft.

8. The combination of the ported valve block, the rotary barrel provided with cylinders arranged to communicate with the ports of said block, the shaft mounted to turn with said barrel, pistons arranged to reciprocate in said cylinders, a ring operatively connected with said pistons, a sleeve having universal connections with the shaft and with said ring respectively, and a race for said ring, inclined relatively to the shaft.

9. The combination of the ported valve block, the rotary barrel provided with cylinders arranged to communicate with the ports of said block, the shaft mounted to turn with said barrel, pistons arranged to reciprocate in said cylinders, a ring operatively connected with said pistons, a tilting box provided with a race for said ring, means for varying the inclination of said box, a sleeve having universal connections with the shaft and with the said ring respectively, said connections being respectively in advance and in the rear of the axis about which the tilting box swings.

10. The combination of the ported valve block, the rotary barrel provided with cylinders converging toward said block and arranged to communicate with its ports, pistons in said cylinders, means for rotating the barrel, and means for causing the pistons to reciprocate as the barrel rotates.

11. The combination of the ported valve block, the rotary barrel provided with converging cylinders arranged to communicate with the ports of said block, pistons in said cylinders, means for rotating the barrel, and means for causing the pistons to reciprocate as the barrel rotates.

12. The combination of the ported valve block, the rotary barrel provided with cylinders arranged to communicate with the ports of said block, the shaft coaxial with said barrel, said shaft and barrel being provided with companion recesses and with opposing shoulders, plugs fitted into said recesses to compel the shaft and barrel to rotate together, springs engaging said plugs to force them against the adjacent shoulder and having a tendency to keep the barrel against the valve block, and means for causing the pistons to reciprocate as the barrel rotates.

13. The combination of the ported valve block, the rotary barrel provided with cylinders to communicate with the ports of said block, the shaft coaxial with said barrel, said shaft and barrel being provided with companion recesses and with opposing shoulders, plugs fitted into said recesses and engaging the shoulder of the barrel, springs engaging the plugs and the shoulder of the shaft, and means for causing the pistons to reciprocate as the barrel rotates.

14. The combination of the ported valve block, the rotary barrel provided with cylinders arranged to communicate with the ports of said block, pistons in said cylinders, rods connected with the pistons at one end and cup-shaped at the other ends, a ring provided with spherically rounded knobs engaging said cup-shaped ends interiorly, retaining members pivoted to said ring and engaging said cup-shaped ends exteriorly, a race on which said ring is mounted to turn, and means for rotating said ring and barrel.

15. The combination of the ported valve block, the rotary barrel provided with cylinders arranged to communicate with the ports of said block, pistons in said cylinders, rods having flattened spherically rounded ends connected with the pistons and cup-shaped outer ends, a ring provided with spherically rounded knobs engaging said cup-shaped ends interiorly, retaining members pivoted to said ring and engaging said ends exteriorly, said members being provided with slots for the passage of the flattened ends of the rods, a race on which said ring is mounted to turn, and means for rotating said ring and barrel.

16. The combination of the ported valve block, the rotary barrel provided with cylinders arranged to communicate with the ports of said block, pistons in said cylinders, rods connected with the pistons at one end and cup-shaped at the other end, a ring provided with spherically rounded knobs engaging said cup-shaped ends interiorly and with sockets at each side of said knobs, yokes pivoted to said sockets and engaging said cup-shaped ends exteriorly, a race on which said ring is mounted to turn, and means for rotating said ring and barrel.

17. The combination of the ported valve block, the rotary barrel provided with cylinders arranged to communicate with the ports of said block, pistons in said cylinders, rods connected with the pistons at one end and cup-shaped at the other end, a ring provided with spherically rounded knobs engaging said cup-shaped ends interiorly and with sockets at each side of said knobs, yokes engaging said cup-shaped ends exteriorly, pivot members projecting from each yoke to engage said sockets, a race on which said ring is mounted to turn, and means for rotating the ring and the barrel.

18. The combination of the ported valve block, the rotary barrel provided with cylinders arranged to communicate with the ports of said block, pistons in said cylinders, rods connected with the pistons at one end and cup-shaped at the other end, a ring provided with spherically rounded knobs engaging said cup-shaped ends interiorly and with sockets at each side of said knobs, yokes engaging said cup-shaped ends exteriorly, screws having shanks screwed into the yokes and heads pivoted within said sockets, a race on which said ring is mounted to turn, and means for rotating the ring and the barrel.

19. The combination of the valve block having a spherically curved ported surface, the rotary barrel arranged to rotate in contact with said surface and provided with converging cylinders arranged to communicate with the ports of the block, the axes of the cylinders being directed toward the center of curvature of said surface, pistons in said cylinders, means for rotating the barrel, and means for causing the pistons to reciprocate in the cylinders as the barrel rotates.

20. The combination of the ported valve block, the rotary barrel provided with cylinders arranged to communicate with the ports of said block, perforated pistons in said cylinders, the fluid-tight casing for said barrel, longitudinally channeled rods connected with the pistons at one end, and cup-shaped at the other end, said other end being provided with a lubricating recess communicating with the channel of the connecting rod, a ring provided with spherically rounded knobs to fit said cup-shaped ends, and a race on which said ring is mounted to turn.

21. The combination of the ported valve block, the stud projecting therefrom, the barrel mounted to turn on said stud and provided with cylinders arranged to communicate with the ports of said block, pistons in said cylinders, a shaft disposed at an angle to said stud, a universal connection between the shaft and the barrel to make them turn in unison, and a ring rigid with said shaft and having individual connections with said pistons.

22. The combination of the ported valve block, the rotary barrel provided with cylinders arranged to communicate with the ports of the block, the shaft arranged at an angle to the barrel's axis, a universal connection between the barrel and the shaft to cause them to rotate in unison, pistons in said cylinders, and means whereby reciprocation of the pistons and rotation of the shaft and barrel will be simultaneous.

23. The combination of the ported valve block, the rotary barrel provided with cylinders arranged to communicate with the ports of the block, the shaft arranged at an angle to the barrel's axis, a universal connection between the barrel and the shaft to cause them to rotate in unison, pistons in said cylinders, a ring rigid with the shaft, and rods the ends of which are connected with the ring and pistons respectively.

24. The combination of the ported valve block, the rotary barrel provided with cylinders arranged to communicate with the ports of said block, pistons in said cylinders, the shaft disposed at an angle to the barrel's axis, a universal joint comprising blocks pivoted to the shaft and barrel respectively about transverse axes, and a rod the respective ends of which have a loose connection with said pivoted blocks, and means whereby reciprocation of the pistons and rotation of the shaft and barrel will be simultaneous.

25. The combination of the ported valve block, the rotary barrel provided with cylinders arranged to communicate with the ports of said block, pistons in said cylinders, the shaft disposed at an angle to the barrel's axis, a universal joint comprising blocks pivoted to the shaft and barrel respectively about transverse axes, at points equi-distant from the point at which the axes of the shaft and of the barrel intersect, and a rod the respective ends of which are connected loosely with said pivoted blocks, and means whereby reciprocation of the pistons and rotation of the shaft and barrel will be simultaneous.

26. The combination of the ported valve block, the rotary barrel provided with cylinders arranged to communicate with the ports of the block, the shaft disposed at an angle to the barrel's axis, the ring rigid with the shaft and provided with a series of spherically rounded knobs the rear surfaces of which are recessed concentrically with the knobs, connecting rods having cup-shaped ends fitted to said knobs, hooks engaging said ends and recessed rear surfaces, pistons located in the cylinders and connected with said rods, and a universal connection between the barrel and said shaft.

27. The combination of the valve block, the rotary barrel provided with cylinders arranged to communicate with the ports of the valve block, pistons in said cylinders, a rotary ring and means connecting it with the pistons in such a manner that rotation of the barrel and ring will be simultaneous with reciprocation of the pistons, a tilting box provided with a race on which the said ring is mounted to turn, a cylinder operatively connected with said box to vary its inclination, a stationary piston on which said cylinder is mounted to slide and dividing it into two chambers, a fluid reservoir having a valved connection with the respective chambers of said cylinder, and means for shifting said cylinder.

28. The combination of the valve block, the rotary barrel provided with cylinders arranged to communicate with the ports of the valve block, pistons in said cylinders, a rotary ring and means connecting it with the pistons in such a manner that rotation of the barrel and ring will be simultaneous with reciprocation of the pistons, a tilting box provided with a race on which the said ring is mounted to turn, a cylinder operatively connected with said box to vary its inclination, a stationary piston on which said cylinder is mounted to slide and dividing it into two chambers, a fluid reservoir having connections with the respective chambers of said cylinder, check valves controlling said connections, a pin arranged to engage the valves and having a limited movement relatively to the cylinder, and means, connected with said pin, for first moving it independently to open one of the valves and then moving the cylinder to adjust the tilting box.

29. The combination of the valve block, the rotary barrel provided with cylinders arranged to communicate with the ports of the valve block, pistons in said cylinders, a rotary ring and means connecting it with the pistons in such a manner that rotation of the barrel and ring will be simultaneous with reciprocation of the pistons, a tilting box provided with a race on which the said ring is mounted to turn, a cylinder operatively connected with said box to vary its inclination, a stationary piston on which said cylinder is mounted to slide and dividing it into two chambers, a fluid reservoir having connections with the respective chambers of said cylinder, check valves controlling said connections, a pin arranged between said valves and slightly shorter than the distance between the valves when closed, said pin having a limited movement relatively to the cylinder, and means, connected with said pin, for first moving it independently to unseat one of the valves and then moving the cylinder to adjust the tilting box.

30. The combination of the ported valve block, the rotary barrel provided with cylinders arranged to communicate with the ports of the block, pistons in said cylinders, a rotary ring and means connecting it with the pistons in such a manner that rotation of the barrel and ring will be simultaneous with reciprocation of the pistons, a tilting box provided with a race on which said ring is mounted to turn, fluid-pressure mechanism for normally holding the tilting box stationary, and means for relieving the pressure in said mechanism to allow the said box to assume a different position.

31. The combination of the ported valve block, the rotary barrel provided with cylinders arranged to communicate with the ports of the block, pistons in said cylinders, a rotary ring and means connecting it with the pistons in such a manner that rotation of the barrel and ring will be simultaneous with reciprocation of the pistons, a tilting box provided with a race on which said ring is mounted to turn, a fluid pressure device for normally holding the tilting box stationary, and unitary means for first relieving the pressure in said device and then swinging the tilting box.

32. In a mechanical structure, the combination of an adjustable part which during the operation of said structure is subjected to pulsations, a cylinder operatively connected with said part to vary its position, a stationary piston within said cylinder, the latter having two passages leading from its respective ends, check valves controlling said passages, an operating member having a limited movement lengthwise of the cylinder to first unseat one of the check valves and then engage the cylinder, and means for actuating said member.

33. In a mechanical structure, the combination of an adjustable part which during the operation of said structure is subjected to pulsations, a cylinder operatively connected with said part to vary its position, a stationary piston within said cylinder, the latter having two passages leading from its respective ends, check valves controlling said passages, an operating member movable relatively to the cylinder and adapted to unseat one or the other of said check valves, and means for actuating said member.

34. In a mechanical structure, the combination of an adjustable part which during the operation of said structure is subjected to pulsations, an adjusting member operatively connected with said part to vary its position, a stationary dash-pot arrangement coöperating with said adjusting member to normally lock the said member and part, said arrangement having outlet passages for relieving pressure and allowing the adjusting member to move in one direction or the other, check valves controlling said passages, an operating member having a limited movement relatively to the adjusting member to first unseat one of the check valves and then engage the adjusting member, and means for actuating said operating member.

35. In a mechanical structure, the combination of an adjustable part which during the operation of said structure is subjected to pulsations, an adjusting member operatively connected with said part to vary its position, a stationary dash-pot arrangement coöperating with said adjusting member to normally lock it in position, said arrangement having outlets for relieving pressure and allowing the adjusting member to move in one direction or the other, an operating member having a limited movement relatively to the adjusting member and adapted to first open one or the other of said outlets and then engage the adjusting member, and means for actuating said operating member.

36. In a mechanical structure, the combination of an adjustable part which during the operation of said structure is subjected to pulsations, an adjusting member operatively connected with said part to vary its position, a fluid-pressure device for normally locking said part in position, and mechanism for relieving the pressure in said device to allow the adjustable part to be brought to a different position.

37. The combination of a stationary valve block having ports, a barrel held to rotate adjacent to said valve block and provided with cylinders having ports adapted to register with those of the valve block, pistons in said cylinders, a member held to rotate with the barrel yet allowing the barrel to slide lengthwise of said member, a shaft disposed at an angle to the axis of the barrel, a direct drive connection between the adjacent ends of said shaft and said member, and a connection between the shaft and the pistons to cause the reciprocation of the pistons in the cylinders to be simultaneous with the rotation of the shaft and barrel.

38. The combination of a stationary valve plate having ports, a barrel held to rotate adjacent to said valve plate, and provided with cylinders having ports adapted to register with those of the valve plate, pistons in said cylinders, a shaft disposed at an angle to the axis of the barrel, a member rotatable in unison with the barrel yet allowing a longitudinal movement of the barrel relatively to said member and projecting therefrom toward said shaft, a driving connection between said shaft and said rotatable member, and a connection between the shaft and the pistons to cause the reciprocation of the pistons in the cylinders to be simultaneous with the rotation of the shaft and of the barrel.

39. The combination of a stationary valve plate having ports, a barrel held to rotate adjacent to said valve plate and provided with cylinders having ports adapted to register with those of the valve plate, pistons in said cylinders, a member located within the barrel and held to rotate therewith, the barrel being movable lengthwise relatively to said member, a shaft disposed at an angle to the axis of barrel, means for compelling the said member and the shaft to rotate in unison, and a connection between the shaft and the pistons to cause the reciprocation of the pistons in the cylinders to be simultaneous with the rotation of the shaft and barrel.

40. The combination of a stationary valve plate having ports, a barrel held to rotate adjacent to said valve plate and provided with cylinders having ports adapted to register with those of the valve plate, pistons in said cylinders, a shaft disposed at an angle to the axis of the barrel, a member coaxial with the barrel and connected to said shaft to rotate in unison therewith, a key carried by said member and engaging the barrel to compel it to rotate in unison with said member yet allowing the barrel to slide lengthwise of said member, and a connection between the shaft and the pistons to cause the reciprocation of the pistons to be simultaneous with the rotation of the shaft and the barrel.

41. The combination of a stationary valve plate having ports, a barrel held to rotate adjacent to said valve plate and provided with cylinders having ports adapted to register with those of the valve plate, pistons in said cylinders, a member held to rotate in unison with the barrel yet allowing the latter to slide lengthwise relatively to such member, a shaft disposed at an angle to the axis of the barrel, means for compelling the shaft and the said member to rotate in unison, means for pressing the barrel yieldingly against the valve plate, and a connection between the shaft and the pistons to cause the reciprocation of the pistons in the cylinders to be simultaneous with the rotation of the shaft and barrel.

42. The combination of the valve block having a ported surface of conical curvature, the rotary barrel arranged in engagement with said surface and provided with cylinders converging toward said block and arranged to communicate with its ports, pistons in said cylinders, a rotary member connected with the pistons, and means whereby reciprocation of the pistons and rotation of the barrel and said member will be simultaneous.

43. The combination of the ported valve block, the rotary barrel provided with cylinders arranged to communicate with the ports of said block, pistons arranged to reciprocate in said cylinders, a rotary member connected with said pistons and arranged at an angle to the axis of the barrel, and a connecting member having two universal connections, one with said barrel and the other with said rotary member.

In testimony whereof I have hereunto set my hand in the presence of two subscribing witnesses.

HARVEY D. WILLIAMS.

Witnesses:
JOHN A. YOUNG,
O. A. THELIN.